US012454052B2

(12) United States Patent
Joly et al.

(10) Patent No.: US 12,454,052 B2
(45) Date of Patent: Oct. 28, 2025

(54) SYSTEMS AND HYBRID POSITION FORCE CONTROL PROCESSES OF AN INDUSTRIAL ROBOT

(71) Applicant: STAUBLI FAVERGES, Faverges-Seythenex (FR)

(72) Inventors: Luc Joly, Faverges-Seythenex (FR); Xavier Lamy, Saint Jorioz (FR); Gildas Rolland, Ugine (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 307 days.

(21) Appl. No.: 18/126,362

(22) Filed: Mar. 24, 2023

(65) Prior Publication Data

US 2023/0302637 A1 Sep. 28, 2023

(30) Foreign Application Priority Data

Mar. 25, 2022 (FR) ...................................... 2202708

(51) Int. Cl.
*B25J 9/16* (2006.01)
*B25J 13/08* (2006.01)

(52) U.S. Cl.
CPC ........... *B25J 9/1633* (2013.01); *B25J 13/085* (2013.01); *G05B 2219/39001* (2013.01)

(58) Field of Classification Search
CPC ...... B25J 9/1633; B25J 13/085; B25J 9/1602; B25J 9/06; B25J 9/126; B25J 9/163; B25J 9/1638; B25J 9/1664; B25J 13/08; G05B 2219/39001; G05B 19/423; G05B 2219/39322; G05B 2219/42123;

(Continued)

(56) References Cited

U.S. PATENT DOCUMENTS

| 5,336,982 | A * | 8/1994 | Backes | B25J 9/1682 318/568.22 |
| 7,853,358 | B2 * | 12/2010 | Joly | G05B 19/237 700/260 |
| 11,192,243 | B2 * | 12/2021 | Nilsson | B25J 15/0019 |

(Continued)

OTHER PUBLICATIONS

Natale et al., "Robust Hybrid Force/Position Control with Experiments on an Industrial Robot", Proceedings of the 1999 IEEE/ASME International Conference on Advanced Intelligent Mechatronics, pp. 956-960, 1999.

(Continued)

*Primary Examiner* — Jaime Figueroa
(74) *Attorney, Agent, or Firm* — MARSHALL, GERSTEIN & BORUN LLP

(57) ABSTRACT

A process of controlling an industrial robot includes the steps of calculating, in a calculation module, a control articular force setpoint of the axis controller module; calculating, in an articular converter, the articular conversion matrix from articular positions; providing the axis controller module with the multi-dimensional external forces exerted on the effector; calculating, in the axis controller module, the vector of the articular forces; calculating, in the axis controller module, the current loop control setpoints, taking into account the articular force vector and the articular force setpoint; and calculating, in the axis controller module, the control setpoints for the power units according to the control setpoints for the current loops.

19 Claims, 6 Drawing Sheets

(58) Field of Classification Search
CPC ........... G05B 2219/39194; G05B 2219/39332; G05B 2219/39338
USPC ................. 700/245–264; 318/568.11–568.25
See application file for complete search history.

(56) References Cited

U.S. PATENT DOCUMENTS

2008/0147238 A1* 6/2008 Joly ..................... G05B 19/237
700/260
2020/0298403 A1* 9/2020 Nilsson .............. B23Q 3/15713

OTHER PUBLICATIONS

Raibert et al., "Hybrid Position/Force Control of Manipulators", Journal of Dynamic Systems, Measurement and Control, vol. 103, No. 2, pp. 128-129, 1981.
Siciliano et al., "Chapter 9—Force Control—Robotics Modelling Planning and Control" In: "Robotics Modelling Planning and Control", pp. 363-406, Springer, 2009.
Search Report Issued in FR Patent Application No. 2202708, dated Nov. 2, 2022.

* cited by examiner

SYSTEMS AND HYBRID POSITION FORCE CONTROL PROCESSES OF AN INDUSTRIAL ROBOT

CROSS-REFERENCE TO RELATED APPLICATION

This application claims priority to French Patent Application No. 22 02708 filed Mar. 25, 2022, the entire disclosure of which is incorporated by reference herein.

FIELD

The present invention relates to industrial robots, and more particularly relates to systems and processes for controlling an industrial robot which can be guided manually.

BACKGROUND

Industrial robots, such as robot arms, are increasingly used in direct operator collaboration applications, wherein operators can act directly on the robot. Such is e.g. the case of surgical applications, or of certain industrial manufacturing processes, among others.

The operator can e.g. act directly on the robot by manipulating and moving a part of the robot arm. Such motion is detected by sensors on the robot. Depending on such feedback, the robot control system accordingly modifies setpoints sent to the robot motors, e.g. to bring or hold the robot arm to the position chosen by the operator, or to accompany a manual movement of the robot by the operator.

Generally, the performance of a robot's "manual" guiding can be measured by different criteria, such as the ease with which the robot can be moved (transparency), the absence of elasticity under the action of the operator (rigidity) and stability, which is evaluated when the robot reaches a limit position imposed by programming or by the user.

None of the robot control solutions available and known at the present time can achieve results which meet the three criteria, which are often difficult to reconcile.

Indeed, in practice, a robot with satisfactory rigidity and transparency will have insufficient stability, because the robot will be subject to bounces when coming into contact with a rigid element of the environment thereof effect under the action of an operator.

There is thus a need for systems and processes for controlling industrial robots which use guiding with improved performance when the robot has to be at least partially guided manually.

SUMMARY

To this end, the invention relates to a process for controlling an industrial robot, the robot including: a multi-axis robot arm comprising at least two electric actuators each apt to move a part of the robot arm with respect to another part of the robot arm about or along an axis of movement, each electric actuator being associated with a sensor configured for measuring the articular position of the corresponding actuator, an effector placed at the end of the robot arm,
  a robot control system including
    a central unit and a single auxiliary unit, the central unit and the auxiliary unit being in communication by means of a data bus,
    an axis controller module configured for calculating the control setpoints of power units which deliver an appropriate electric current to the actuators according to an articular force setpoint and implemented by a single auxiliary unit, and a calculation module configured for determining the articular force setpoints for the axis controller module, the calculation module being connected to the axis controller module,
  a data acquisition interface configured for receiving and sending actuator positions measured by the sensors associated with the actuators, to the calculation module and to the axis controller module,
  a multi-axis force sensor apt to measure multi-dimensional external forces exerted on the robot arm and positioned between the end of the robot arm and the effector and sending the multi-dimensional external forces to the axis controller module
wherein the control process includes the steps of:
calculating, in the calculation module, an articular force setpoint for controlling the axis controller module, and
calculating, in an articular converter implemented by the central unit, an articular conversion matrix from the articular positions, the articular conversion matrix being sent to the auxiliary unit,
providing the axis controller module with the multi-dimensional external forces exerted on the effector,
calculating, in the axis controller module, the vector of the articular forces according to the external forces exerted on the effector, using the articular conversion matrix,
calculating, in the axis controller module, current loop control setpoints, taking into account the articular force vector and the articular force setpoint,
calculating, in the axis controller module, the control setpoints for the power units according to the control setpoints for the current loops.

In some embodiments, a step prior to the calculation, in the axis controller module, of the vector of the articular forces according to the external forces exerted on the effector and using the articular conversion matrix, consists of calculating in a gravity compensator, the weight of the effector from the articular positions and the vector of the articular forces is calculated in the axis controller module, by subtracting the weight of the effector from the multi-dimensional external forces, so as to disregard the weight of the effector and by applying the conversion matrix to the result to convert same into the articular domain.

In some embodiments, the central unit implements a gravity compensator which calculates the weight of the effector and sends the weight of the effector to the auxiliary unit for taking into account multi-dimensional external forces exerted on the effector.

In some embodiments, the data acquisition interface, the multi-axis force sensor, and the auxiliary unit communicate by means of a data bus configured such that:
  data frames travel one-way on the data bus following a communication loop connecting the data acquisition interface, the multi-axis force sensor and the auxiliary unit, the data acquisition interface and the multi-axis force sensor being placed before the auxiliary unit in any order,
  the data acquisition interface can add the articular positions of the actuators to the data frames during frame passage,
  the multi-axis force sensor adds the external forces exerted on the robot arm to the data frames during frame passage,
  the auxiliary unit reads the articular positions of the actuators and the multi-dimensional external forces exerted on the robot arm in the data frames during frame passage.

In some embodiments, steps prior to calculating the articular force setpoint for controlling the axis controller module consist of:

calculating a time-dependent composite setpoint defining articular forces and velocities, according to a target trajectory, and at calculate a behavior matrix which describes a desired behavior of the robot arm, defining directions wherein the calculated composite setpoint should apply, the calculation of the articular force setpoint for controlling the axis controller module then including a calculation of the time derivative of a homogeneous internal state at an articular position, the calculation of the articular force setpoint being carried out according to the previously calculated composite setpoint, the previously calculated behavior matrix, measured articular positions, articular velocities derived from measured articular positions, the internal state and a controller function which adjusts the gap between an articular position and the internal state, the internal state being determined by integrating said time derivative of the internal state.

In some embodiments, the control function is a proportional-integral-derivative controller.

In some embodiments, the articular force setpoint and the time derivative of the internal state are solutions of the following system of differential equations:

$$\begin{cases} \dot{q}_{mv} = u - Y\left(K_p(q_{mv} - q_r) + K_i \int (q_{mv} - q_r)dt - K_d\dot{q}_r\right) \\ \tau = K_p(q_{mv} - q_r) + K_i \int (q_{mv} - q_r)dt + K_d(\dot{q}_{mv} - \dot{q}_r) \end{cases}$$

where $q_{mv}$ is the function corresponding to said internal state, $\dot{q}_{mv}$ is the time derivative of the internal state, T is the articular force setpoint, Y is the behavior matrix and u is said composite setpoint and where Kp, Ki and Kd are gains, and Ki and/or Kd can be zero.

In some embodiments, the central unit implements the calculation of the composite setpoint and of the behavior matrix and the auxiliary unit implements the calculation of the articular force setpoints.

In some embodiments, the central unit calculates and sends to the auxiliary unit, the composite setpoint and the behavior matrix with a first frequency and the auxiliary unit calculates the articular force setpoint for controlling the axis controller module with a second frequency higher than the first frequency.

In some embodiments, the second frequency is between two and twenty times higher than the first frequency, preferentially between five and ten times higher than the first frequency, even more preferentially eight times higher than the first frequency.

In some embodiments, the auxiliary unit calculates the articular force setpoints for controlling the axis controller module with a frequency chosen between 500 Hz and 20 kHz, preferentially between 5 kHz and 12 kHz, preferentially equal to 8 kHz.

In some embodiments, the calculation of the composite setpoint and the behavior matrix takes into account the internal state.

In some embodiments, the communication link is configured such that:

the central unit is master, data frames travel one-way on the data bus following a loop linking the central unit, the data acquisition interface, the multi-axis force sensor and the auxiliary unit, the data acquisition interface and the multi-axis force sensor being placed before the auxiliary unit in any order, the auxiliary device adds the internal state to the data frame during the frame passage the data frame is fed back to the central unit at the end of each communication cycle.

According to another aspect, the invention relates to a control system for an industrial robot, the robot including:

a multi-axis robot arm comprising at least two electric actuators each apt to move a part of the robot arm relative to another part of the robot arm about or along an axis of movement, each electric actuator being associated with a sensor configured for measuring an articular position of the corresponding actuator, and an effector placed at the end of the robot arm, the control system comprising:

a central unit and a single auxiliary unit, suitable for communicating by means of a data bus, an axis controller module configured for calculating control setpoints for power units which deliver an appropriate electric current to the actuators according to a articular force setpoint, the axis controller module being implemented by the single auxiliary unit, the control module comprising force and velocity loops and current control loops, and a calculation module configured for calculating articular force setpoints for the axis controller module, the calculation module being connected to the axis controller module, a data acquisition interface configured for receiving and sending actuator positions measured by the sensors associated with the actuators, to the calculation module and to the axis controller module, a multi-axis force sensor (20) apt to measure multi-dimensional external forces exerted on the robot arm and placed between the end of the robot arm and the effector and sending the multi-dimensional external forces to the axis controller module, wherein:

the central unit implements an articular converter configured for calculating an articular conversion matrix from the articular positions, the articular conversion matrix being sent to the auxiliary unit, the axis controller module implements an impedance control module configured for calculating a vector of articular forces according to external forces exerted on the effector, by using the articular conversion matrix, the axis controller module is configured for calculating current loop control setpoints by taking into account the vector of the articular forces and the articular force setpoint, the axis controller module is configured for calculating the control setpoints of the power units according to the control setpoints of the current loops.

According to a particular aspect, the axis controller module comprises force and velocity loops, configured for receiving the multi-dimensional external forces from the multi-axis force sensor, and for calculating control setpoints for the current loops, and current control loops configured for calculating the control setpoints of the power units.

According to another aspect, the invention relates to an industrial robot comprising such a control system and adapted to implement a control process as described.

BRIEF DESCRIPTION OF THE DRAWINGS

The invention will be better understood and other advantages thereof will appear more clearly in the light of the following description, given only as an example and made with reference to the enclosed drawings, wherein.

DETAILED DESCRIPTION

Figure 1:
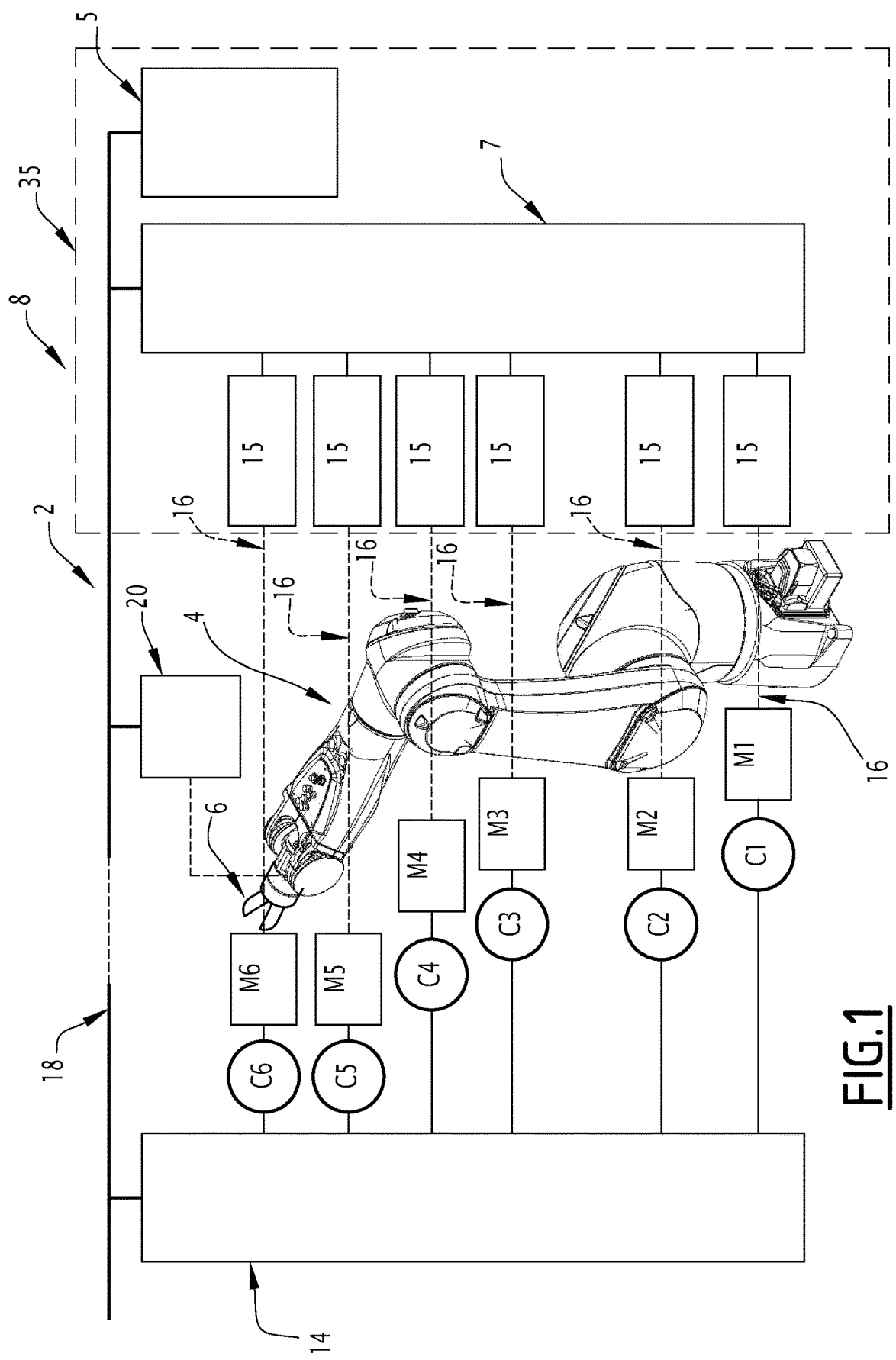
FIG. 1 shows schematically and in structural blocks, an industrial robot according to the invention as per one embodiment.

FIG. 1 shows an example of industrial robot 2.

The robot 2 includes a multi-axis robot arm 4. The robot arm 4 includes e.g. a plurality of segments articulated in pairs about axes of rotation.

The robot arm 4 can comprise an effector 6, such as a controllable tool, which is placed at the end of the robot arm 4.

The robot arm 4 includes a plurality of electric actuators, denoted by M1, M2, M3, M4, M5 and M6 in the example shown in FIG. 1 (and denoted hereinafter by M1 to M6). Each of the electric actuators is apt to rotate or translate a portion of the robot arm 4 with respect to another part of the robot arm 4 about an axis of movement, such as one of the axes of rotation.

Each electric actuator M1 to M6 includes an electric motor, such as synchronous brushless electric motors, or any other suitable electric motor.

The robot 2 further includes a plurality of sensors, denoted by C1, C2, C3, C4, C5 and C6 in the example shown in FIG. 1 (and denoted hereinafter by C1 to C6).

Each electric actuator M1 to M6 is associated with a sensor C1 to C6. Each sensor C1 to C6 is configured for measuring an articular position of the electric actuator. Sensors C1 to C6 e.g. are angle sensors, such as rotary encoders. The articular position corresponds e.g. to an angular position of the articulation.

Preferentially, the robot 2 is a 6-axis robot. The robot arm 4 thus has six degrees of freedom and includes six electric actuators M1 to M6 and six sensors C1 to C6.

The robot 2 further includes a control system 8.

Figure 2:
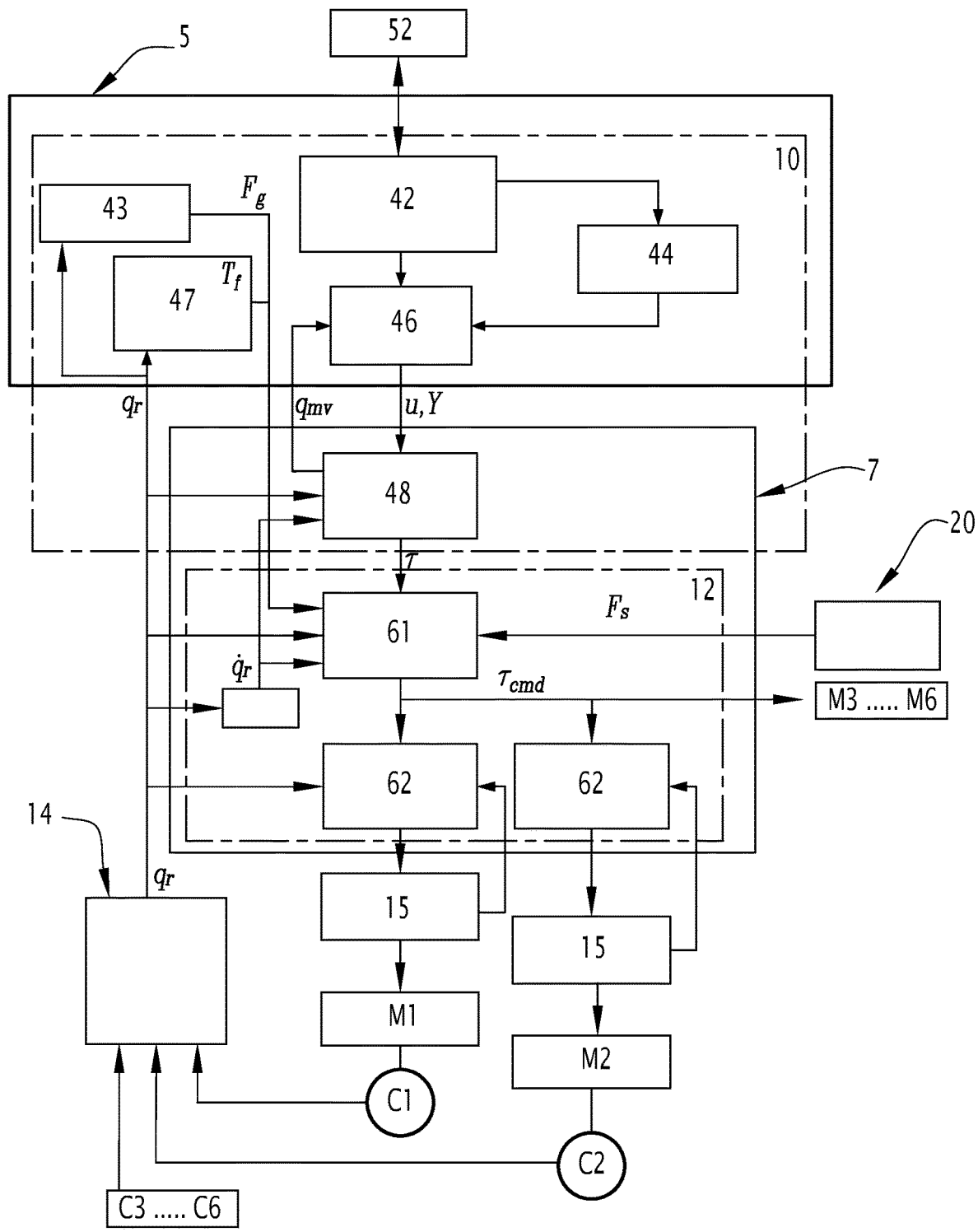
FIG. 2 is a functional block diagram of the industrial robot shown in FIG. 1 according to the embodiment shown in FIG. 1.
Figure 3:
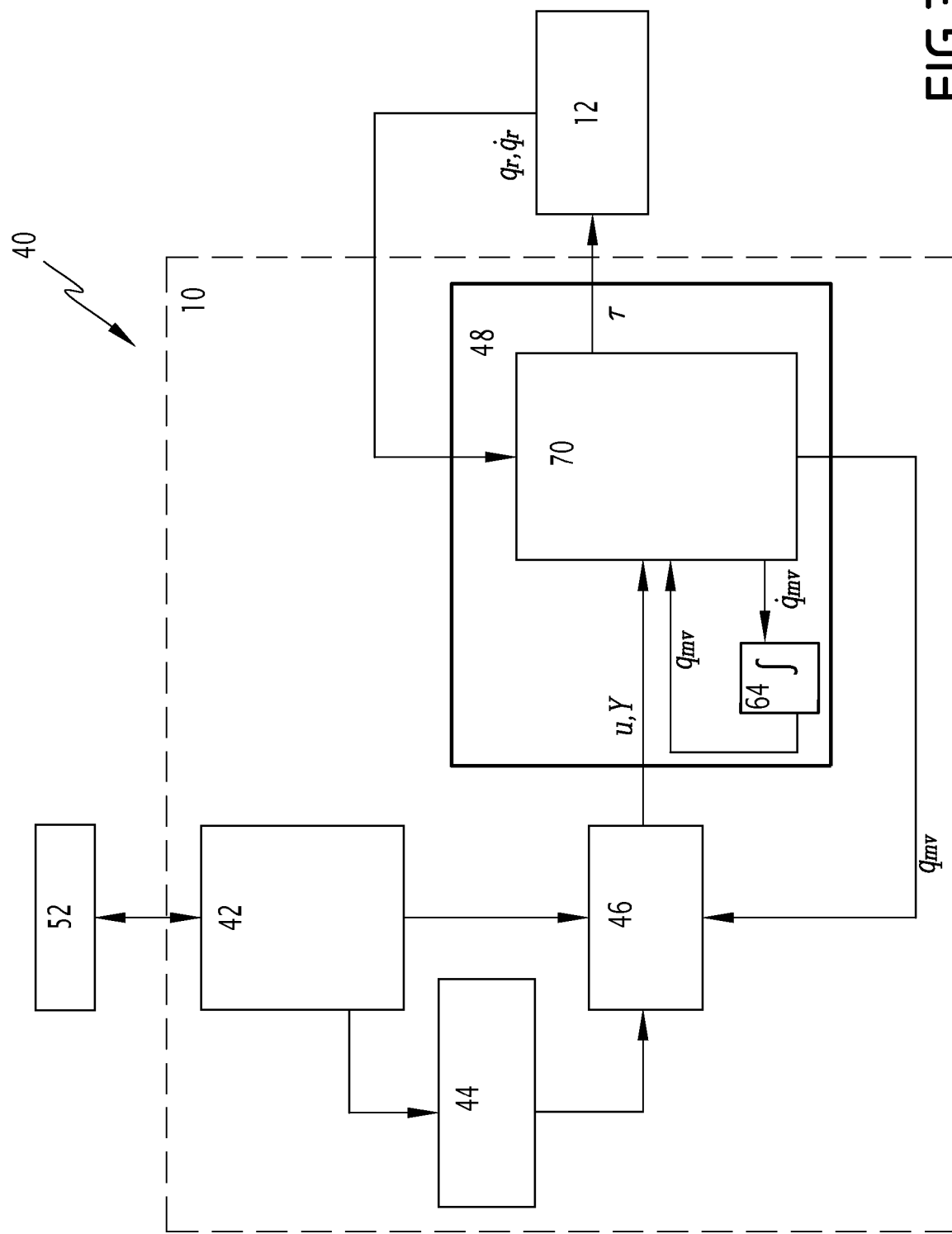
FIG. 3 is a synthetic block diagram illustrating the control system according to the invention.

In an embodiment illustrated in FIGS. 1, 2 and 3, the control system 8 includes an electronic robot controller, which comprises:
 a central unit 5,
 an auxiliary unit 7 and
 6 power units 15.

As defined in the present description, the term "articular" refers to either the (angular) position of each articulation of the robot arm 4, or to the current (angular) position of each actuator M1 to M6 of the robot. The expression "articular forces" refers to the forces controlled on each articulation of the robot arm, or on each actuator M1 to M6.

Conventionally, a spatial position is defined either in a Cartesian space or in the articular space, wherein the articular positions of each articulation of the robot arm are expressed.

In the description, the term "force" refers to a mechanical force or torque.

The central unit 5 is in communication with the auxiliary unit 7 via a data link such as a data bus 18, in particular a field bus.

In practice, the auxiliary unit 7 is connected to power units 15 which deliver, via electrical conductors 16, an appropriate electric current to the actuators M1 to M6.

The power unit 15 is a device comprising controllable switches coupled to a power supply and apt to generate the currents in the phases of a motor according to control signals from the switches called power unit control setpoints. The device comprises sensors for measuring the phase currents of the motors. Such current measurements are sent to the current loop 62 so as to adapt, through feedback, the control of the controllable switches of the power unit 15.

The control system 8 further includes a data acquisition interface 14, such as an electronic card. The data acquisition interface 14 is connected to the sensors C1 to C6 and is configured for receiving data measured by the sensors C1 to C6.

The sensors C1 to C6 e.g. are connected to the data acquisition interface 14 by communication links compatible with an industrial communication protocol, such as the EnDat protocol, or an equivalent protocol.

The data acquisition interface 14 is connected to the central processing unit 5 and to the auxiliary unit 7 by a data link such as a data bus 18, in particular a field bus.

Preferentially, the data bus 18 is compatible with the EtherCAT (Ethernet for Control Automation Technology) communication protocol.

The constituents of the control system 8 can advantageously be grouped together in a control cabinet. Alternatively, the data acquisition interface 14 can be placed in the robot arm, like the actuators M1 to M6 and the sensors C1 to C6. The central unit 5, the auxiliary unit 7 and the power units 15 can be placed in a control cabinet 35 shown in dotted lines in FIG. 1.

A multi-axis force sensor 20 placed between the end of the robot arm 4 and the effector 6 is connected to the central processing unit 5 and to the auxiliary processing unit 7 via the data bus 18. The multi-axis force sensor 20 consists of at least 6 measuring devices, e.g. piezo-resistive strain gages rigidly attached to a test body. The geometrical arrangement of the devices, not necessarily aligned with a canonical Cartesian reference system, can be used for reconstructing the complete force screw by linear combination of the measurements same produces.

The multi-axis force sensor 20 is configured for providing the multi-dimensional external forces $F_s$.

The data bus 18 enables the different equipment such as the central unit 5, the auxiliary unit 7, the data acquisition interface 14 and the multi-axis force sensor 20 to communicate by circulating data frames sent synchronously or cyclically.

Preferentially, the communication is carried out unidirectionally (or in one direction), yet making cross-communication possible.

The central processing unit 5 e.g. acts as a "master" on the data bus and the other connected equipment act as "slaves". The "slave" equipment can read the data contained in each data frame and add data to the data frame during the passage of the latter, the data frame being fed back to the central unit at the end of each communication cycle.

Figure 4:
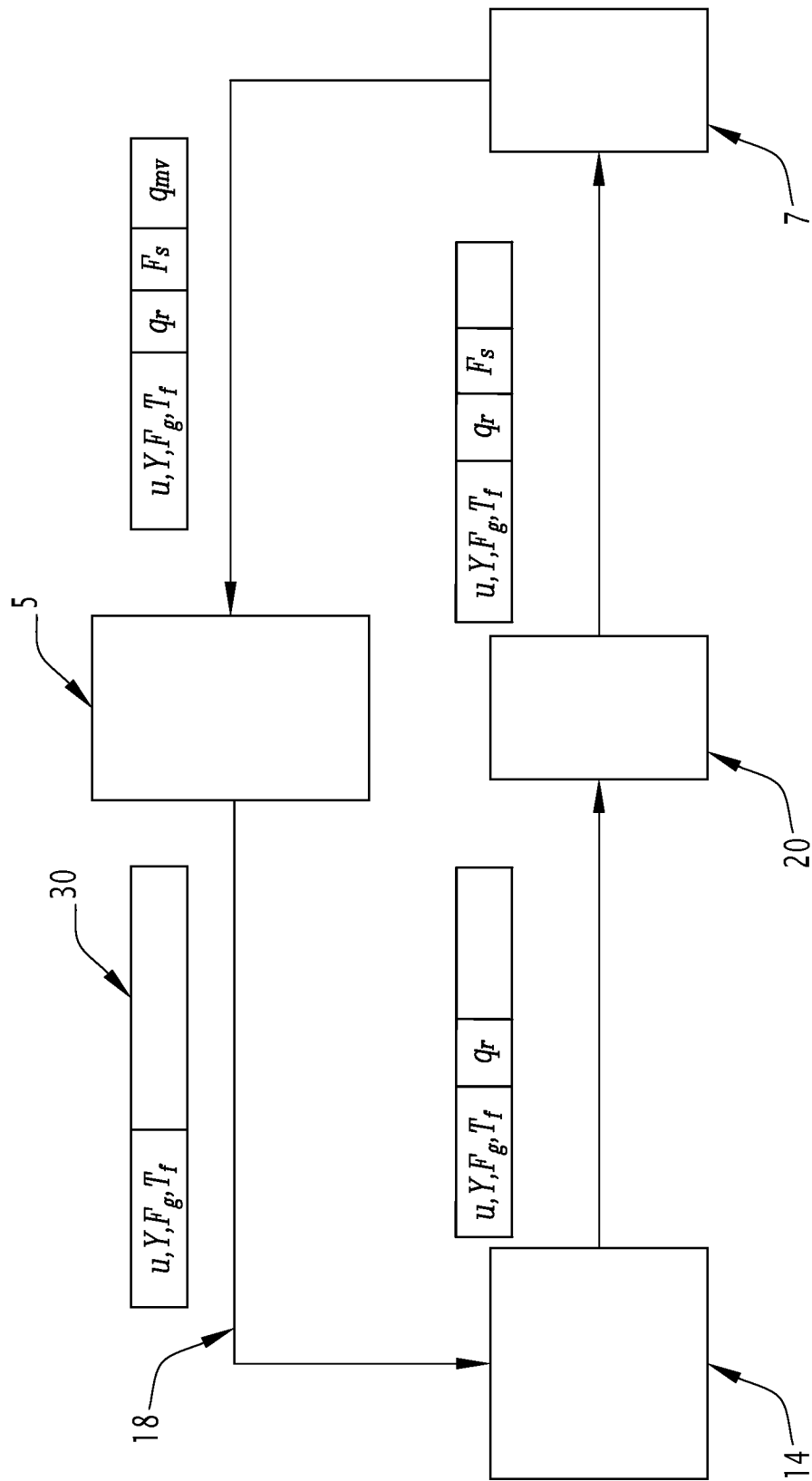
FIG. 4 is a block diagram illustrating data communication between robot units.

As illustrated in FIG. 4, the central processing unit 5 sends a data frame 30 which arrives first at the data acquisition interface 14. The data acquisition interface 14 completes the data frame 30 with data such as e.g. the articular positions $q_r$ of the actuators M1 to M6. The data frame then reaches the multi-axis force sensor 20. The multi-axis force sensor 20 completes the data frame with the measured multi-dimensional external forces P. The data frame 30 then reaches the auxiliary unit 7 which can read the articular positions $q_r$ of the electric actuators M1 to M6 and the measured multi-dimensional external forces $F_s$ which have just been written into the data frame 30. The data frame 30 then reaches the central unit 5 which can read the articular positions $q_r$ of the electric actuators M1 to M6 and the measured multi-dimensional external forces P. Thus, a communication loop is formed, having the "master" node, which herein is the central processing unit 5, as start and end point.

The data acquisition interface 14 and the multi-axis force sensor 20 e.g. are placed before the auxiliary unit 7, in the communication loop, in any order.

In a variant, the central processing unit 5 can implement cyclic communications at different frequencies. Certain data frames 30 sent at high frequency can be dedicated to communicating the articular positions $q_r$ of the electric actuators M1 to M6, while certain data frames 30 sent at a lower frequency can be dedicated to communicating the measured multi-dimensional external forces P.

The EtherCAT (EtherCAT Automation Protocol) protocol can be used for implementing a unidirectional communication wherein data frames travel by following a loop successively connecting the central unit 5, the data acquisition interface 14, the multi-axis force sensor 20 and the auxiliary unit 7. In addition, the EtherCAT protocol allows cross-communication, i.e. the possibility for a slave to send data which will be read in the same communication cycle by another slave placed after same in the communication loop.

In a variant, the central unit 5, the auxiliary unit 7, the data acquisition interface 14 and the multi-axis force sensor 20 can communicate in pairs via different data buses. More particularly, the multi-axis force sensor 20 can communicate directly with the axis controller module 12, described hereinafter in greater detail. In other words, the communication link connecting the central unit 5, the auxiliary unit 7 and the data acquisition interface 14 can include a plurality of data buses of different nature.

FIG. 3 specifies the way the robot 2 is controlled by the control system 8. In FIG. 3, the control functions of the robot 2 are represented by a simplified block diagram 40, only the functions essential to the understanding of the invention being illustrated and described in detail.

The control system 8 implements an application program execution module (module 42), a trajectory generator (module 44) and an impedance manager (module 46).

The application program execution module 42 addresses instructions to the trajectory generator 44, e.g. in the form of asynchronous controls.

The application program execution module 42 can also be used for selecting the appropriate operating mode for the impedance manager 46. A mode of operation under position control e.g. can be chosen, or a mode of operation under force control, or a hybrid mode of operation mixing force control and position control, or a mode of operation under impedance control.

The application program execution module 42 can also return status information to a user.

The trajectory generator 44 receives high-level instructions (e.g., an instruction to move in a straight line to a given destination in space) and transforms the instructions into a succession of articular or Cartesian positions, e.g. by applying a kinematic model associated with the robot arm 4 and, where appropriate, by taking into account mechanical constraints such as reduction gears and any mechanical couplings.

The trajectory generator 44 can also, in a similar way, generate force trajectories (such as a force in a given direction changing progressively from one value to another). Preferentially, the position and force trajectories are synchronized.

The impedance manager 46 generates the articular controls so as to give the robot a defined behavior, e.g. to follow a trajectory in a Cartesian space.

Such controls are preferentially generated using operating mode information supplied by the application program execution module 42, but also and above all according to movement setpoints (such as positions and velocities) and/or synchronous force setpoints, and according to a quantity, denoted by $q_{mv}$, which will be described in greater detail hereinafter.

The articular controls generated by the impedance manager 46 comprise a composite force and/or velocity setpoint, denoted by "u", and a behavior matrix, denoted by Y. Y is e.g. a square matrix of dimension n, and u is a vector of dimension n, n being the number of motors of the robot. The behavior matrix Y describes a desired behavior of the robot arm, defining directions wherein the composite setpoint u is to be applied. The coefficients of the behavior matrix Y can be time-dependent functions. Similarly, the composite setpoints u can depend on time.

In a variant, the composite setpoints "u" could be separated into two distinct variables: a velocity setpoint on the one hand and a force setpoint on the other hand. However, grouping same into a single variable limits data exchange between components in the physical implementation.

In the present description, the term "impedance" refers to the mechanical impedance of the robot arm 4. Indeed, one of the arms of the control method is to control the behavior and the response of the robot arm 4 when same is subject to external forces, e.g. when same encounters an obstacle or when a user exerts a manual force on the robot arm (e.g. for guiding the robot manually).

The mechanical impedance of the robot characterizes the response of the robot arm 4 to an external mechanical force. A zero (or near-zero) impedance means that the robot moves freely as soon as an attempt is made to apply a force on the robot. An infinite (or very large) impedance means that the robot arm remains stationary regardless of the external force applied. The impedance of the robot can be chosen differently for different directions in space, e.g. by selecting a very high impedance in certain directions and a low impedance in other directions.

In general, the control system 8 of the robot is configured for calculating the time-dependent composite setpoints u defining articular forces and velocities, according to a target trajectory and a chosen mode of operation, and for calculating the behavior matrix Y which describes a desired behavior of the robot arm, defining directions wherein the calculated composite setpoint u is to be applied. Such calculation is repeated cyclically.

The control system 8 further includes an articular impedance controller (module 48) which receives the composite setpoint u and the behavior matrix Y generated by the impedance manager 46, as well as the articular position and velocity of the robot (respectively denoted by $q_r$ and $\dot{q}_r$) obtained from sensors the C1 to C6.

On the basis of such information, the articular impedance controller 48 is configured for generating the articular force setpoints (denoted by "τ") so that the robot follows the behavior defined by the composite setpoint u and the behavior matrix Y generated by the impedance manager 46. In addition, the articular impedance controller 48 generates and/or updates the quantity $q_{mv}$, which corresponds to an internal state comparable to an internal and virtual articular position setpoint, which will be used for calculation purposes.

The control system 8 finally includes an axis controller module 12.

The axis controller module 12 implements one or a plurality of control loops which control the actuators so that the forces applied follow the articular force setpoint T received from the articular impedance controller 48. The axis controller module 12 comprises force and velocity loops 61 which provide force and velocity control and generate the current loop control setpoints $\tau_{cmd}$ which can take into account the gravity compensations of the robot 4 and of the effector 6. The articular velocity 4, is obtained e.g. by numerical differentiation of the position $q_r$ of the robot. In practice, the position and the articular velocity of the robot ($q_r$ and $\dot{q}_r$) as well as all the articular forces can have the form of vectors the coefficients of which correspond to the different articulations or actuators.

In summary, the robot control system is thus configured for calculating an articular force setpoint τ for controlling the axis controller module and the time derivative $\dot{q}_{mv}$, of a homogeneous internal state $q_{mv}$ at an articular position, such calculation being performed according to said composite setpoint u previously calculated, said behavior matrix Y, said measured articular positions $\dot{q}_r$, articular velocities 4, derived from the measured articular positions $q_r$, and to the internal state $q_{mv}$.

The robot 2 advantageously includes a human-machine interface 52 (HMI) for acquiring controls and instructions coming from a user and for displaying or sending information to the user, such as information on the internal state of the robot 2 and/or on operating parameters.

The control system 8 of the robot implements a calculation module 10 which incorporates the functions of the modules 42, 44, 46 and 48. The calculation module 10 is apt to generate the articular force setpoints T for controlling the axis controller module 12. The axis controller module 12 is apt to calculate the control setpoints for power units 15 which deliver an appropriate electric current to the motors M1 to M6.

FIG. 2 describes how the calculation module 10 and the axis controller module 12 are implemented. The central unit 5 and the auxiliary unit 7 each include at least one processor, such as a programmable microcontroller or a microprocessor, which is coupled to a computer memory which includes executable instructions and/or a software code intended to implement a process for controlling the robot when the instructions are executed by the processor. The central processing unit 5 is apt to operate the functions of the modules 42, 44 and 46.

The central processing unit 5 communicates to the auxiliary unit 7, via the data bus 18, the composite setpoint u and the behavior matrix Y.

The auxiliary unit 7 is apt to operate the functions of the module 48, i.e. of the articular impedance controller which calculates the articular force setpoints T and sends same to the axis controller module 12 which implements force and velocity control loops 61 and current control loops 62.

The auxiliary unit 7 is also apt to operate the functions of the axis controller module 12, in other words the auxiliary unit 7 implements the axis controller module 12, and thus implements the force and velocity control loops 61 and the current control loops 62. The auxiliary unit 7 is connected to the 6 power units 15 and thus sends power unit control setpoints to same. For the clarity of FIG. 2, only two of the six power units 15 are shown.

The articular force servo-control can be implemented by the axis controller module 12 according to well-known common control strategies, which are not described in more detail, the essential thing being that the forces exerted on each of the articulations of the robot comply well with the calculated articular force setpoint τ.

In practice, it is advantageously possible to use force servo-control of the robot based on current servo-control of each of the actuators M1 to M6, the current servo-control being performed by the current loop 62, for each actuator M1 to M6, according to the angular position information from the sensor C1 to C6 associated with the actuator M1 to M6 and to the measurement of the currents of the power units 15.

In many cases, the force servo-control provided by the force and velocity loop 61 can further include a correction aimed at compensating for the gravity and friction of the robot arm, the friction corrections being calculated for each articulation from the velocity of rotation determined for the articulation, the gravity being calculated for each articulation from the angular position and the dynamic model of the robot arm 4.

A correction is made to the servo-control strategy depending on the forces and/or torques measured by the multi-axis force sensor 20. Different correction strategies can be implemented depending on whether a multi-axis force sensor is mounted at the end of the robot arm, or depending on whether a plurality of force sensors are associated with the respective articulations of the robot arm 4.

When a multi-axis force sensor 20 is placed between the end of the robot arm and the effector 6, the calculation module 10 then includes a gravity compensator 43 which calculates the weight of the effector $F_g$. The weight of the effector $F_g$ is a vector representing the force screw of the weight of the effector 6, expressed in the reference frame of the multi-axis force sensor 20. Same is calculated from the parameters of the tool carried by the robot (mass, position of the center of gravity), the geometric model of the robot arm and the articular positions measured $q_r$. The weight of the effector $F_g$ is subtracted from the measurement of the multi-axis force sensor 20 at the force and velocity loops 61 so as not to take into account the weight of the effector in the control, but only the forces exerted on the effector 6. The calculation module 10 further includes an articular Cartesian converter 47 which calculates the articular conversion matrix $T_f$. The articular conversion matrix $T_f$ is the matrix which converts the multi-dimensional external forces $F_s$ expressed in a Cartesian space, into data expressed in the articular space. $T_f = J_f^T T_c$, where $J_f$ is the Jacobian matrix of the robot connecting the Cartesian velocity of the center of the multi-axis force sensor 20 to the articular velocities of the robot 2 and $T_c$ is a matrix which is used for transforming the measurements of the multi-axis force sensor 20, initially expressed in the coordinates of the force sensor, for expressing same in the coordinate system of the robot base. $J_f$ and $T_c$ are calculated from the articular positions $q_r$.

The articular conversion matrix $T_f$ and the weight of the effector $F_g$ are sent to the force and velocity loops 61.

In the chosen embodiment and as illustrated in FIG. 4, the articular conversion matrix $T_f$ and the weight of the effector $F_g$ are sent to the force and velocity loops 61 via a data frame 30 which comes from the central unit 5 which implements the gravity compensator 43 and the articular Cartesian converter 47. The force and velocity loops 61 are implemented by the auxiliary unit 7.

In the calculation of current loop control setpoints $\tau_{cmd}$, the force and velocity loops 61 subtract the effector weight $F_g$ from the multi-dimensional external forces $F_s$ so as to disregard the effector weight and apply the articular conversion matrix $T_f$ to the result, for converting same into the articular domain, as given in the following formula:

[Math 1]

$$\tau_s = T_f(F_s - F_g)$$

Alternatively, the force and velocity loops 61 can first apply the articular conversion matrix $T_f$ to the effector weight $F_g$ and to the multi-dimensional external forces $F_s$ and then perform the subtraction.

Figure 5:
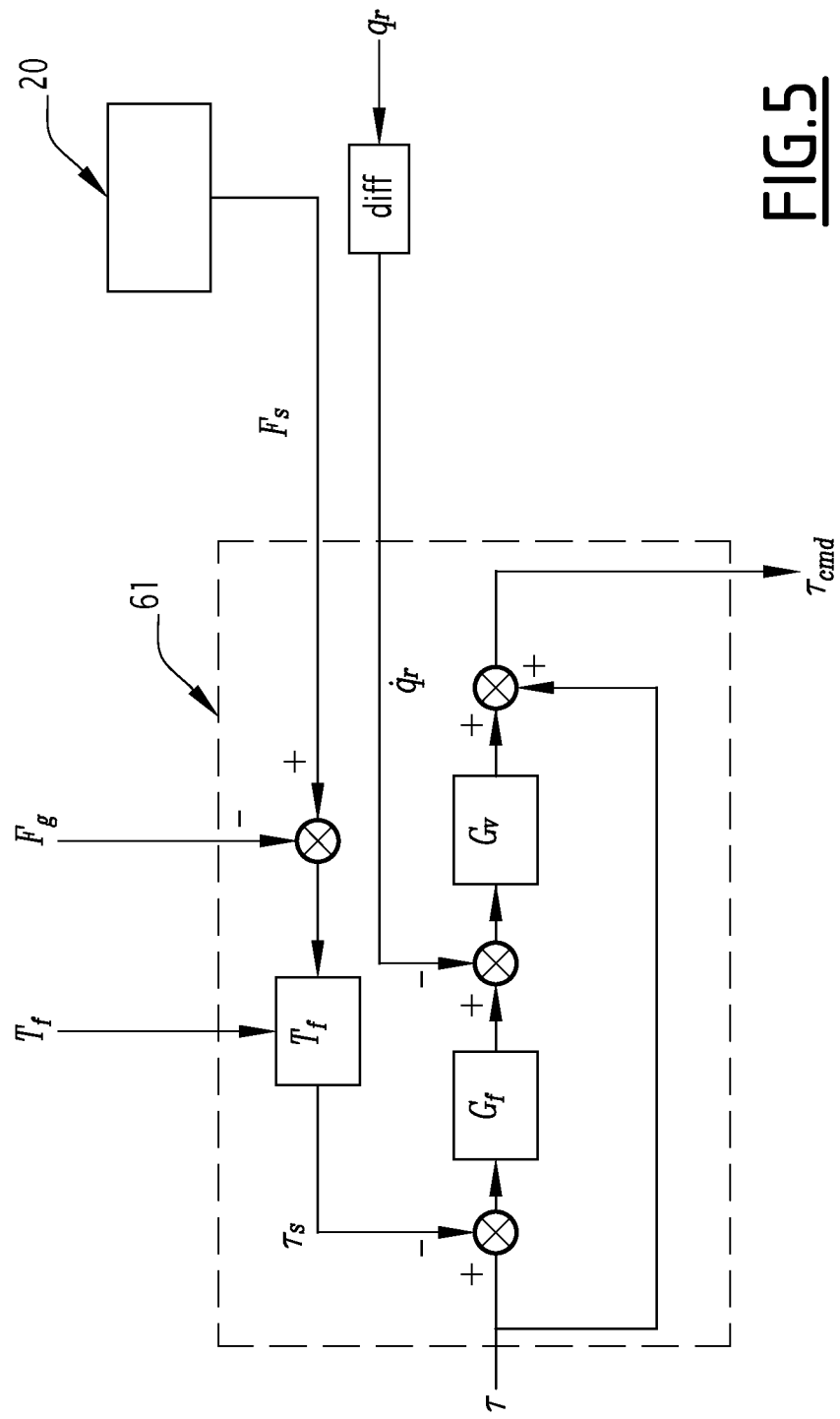
FIG. 5 is a functional diagram showing the details of the load and velocity loops.

According to an advantageous implementation illustrated in FIG. 5, the correction of the articular force setpoints $T_f$ in the presence of a multi-axis force sensor 20, can be carried out by associating a compensation for gravity with two force and velocity correctors, denoted by $G_f$ and $G_v$, respectively, which correct the articular force setpoints provided to the robot arm 4. The force corrector $G_f$ e.g. is an integral controller, and the velocity corrector $G_v$ is a proportional controller.

In the chosen embodiment of the invention, the gravity compensator 43 and the articular Cartesian converter 47 are implemented in the central unit 5. The articular conversion matrix $T_f$ and the weight of the effector $F_g$ are sent by the link bus 18 to the force and velocity loops 61 which are implemented in the auxiliary unit 7.

Such implementation is advantageous because same allows all the calculations implemented in the auxiliary unit 7 to be carried out in articular coordinates. Such calculations are relatively simple (unlike the calculations made in the modules 43, 47, and 46). In this way, the impedance controller 48 and the force and velocity loops 61 can be calculated at a higher frequency. Moreover, many known solutions require the force measured by the multi-axis force sensor 20 to be returned to the central unit so that the latter calculates position, velocity or force setpoints, which are intended for controlling the actuators, thus leading to more delay in the force control loop, which results in lower accuracy and lower performance when the robot has to be guided, at least in part, manually.

As can be seen in FIG. 3, the articular impedance controller 48 comprises a resolution module 70 and a display module 64. The resolution module 70 is configured for calculating the articular force setpoints T and for sending the calculated articular force setpoints $\tau$ to the axis controller module 12. Such calculation is performed according to the previously calculated composite setpoint u, the previously calculated behavior matrix Y, the measured articular positions $q_r$, articular velocities $\dot{q}_r$ derived from the measured articular positions $q_r$ and the previously calculated internal state $q_{mv}$.

In particular, the articular force setpoint $\tau$ used for controlling the axis controller module 12 is calculated from a control function which controls the difference between the articular position $q_r$ and the internal state $q_{mv}$ (previously defined with reference to the articular impedance controller 48).

The resolution module 70 calculates the derivative $\dot{q}_{mv}$ of the internal state according to the previously calculated composite setpoint u, the previously calculated behavior matrix Y, the articular position $q_r$, the articular velocities 4, and the previously calculated internal state $q_{mv}$.

The integration module 64 determines the internal state $q_{mv}$ by integrating the time derivative $\dot{q}_{mv}$ of the internal state. The resolution module 70 e.g. uses the value of the internal state $q_{mv}$ already known from a previous calculation cycle, and stored in memory.

Preferentially, the control function is a proportional-integral-derivative controller (PID controller).

Advantageously, the articular force setpoint $\tau$ and the time derivative $\dot{q}_{mv}$ of the internal state are solutions of the following system of differential equations:

$$\begin{cases} \dot{q}_{mv} = u - Y\left(K_p(q_{mv} - q_r) + K_i \int (q_{mv} - q_r)dt - K_d \dot{q}_r\right) & \text{[Math 2]} \\ \tau = K_p(q_{mv} - q_r) + K_i \int (q_{mv} - q_r)dt + K_d(\dot{q}_{mv} - \dot{q}_r) \end{cases}$$

where $q_{mv}$ is the function corresponding to said internal state, $\dot{q}_{mv}$ is the time derivative of the internal state, $\tau$ is the articular force setpoint, herein presented in the form of a vector, Y being the behavior matrix and u being said force or position setpoint.

In the equations, Kp, Ki, and Kd are gain matrices. In practice, the gains Kp, Ki and Kd are the gains used to set the parameters of the PID controller. Kp, Ki, and Kd e.g. correspond to proportional, integral, and derivative gains, respectively. Kp and Ki can be zero matrices if appropriate.

In such system e.g., the second equation performs a proportional integral derivative (PID) servo-control of the articular position of the robot $q_r$ on the position $q_{mv}$. The first equation defines the change of the virtual position represented by the internal state $q_{mv}$.

According to a first example of implementation, the articular impedance control can be performed by a controller satisfying the following system of equations:

$$\begin{cases} \gamma = K_p(q_{mv} - q_r) + K_i \int (q_{mv} - q_r)dt - K_d \dot{q}_r & \text{[Math 3]} \\ \dot{q}_{mv} = u - Y\gamma \\ \tau = \gamma + K_d \dot{q}_{mv} \end{cases}$$

where $\gamma$ is an intermediate variable used to calculate the behavior matrix Y, the intermediate variable $\gamma$ being calculated from the internal state $q_{mv}$, the articular position $q_r$ and the articular velocity $\dot{q}_r$.

The first implementation of the impedance controller is particularly advantageous because the behavior matrix Y is symmetrical, so that only some of the coefficients need to be sent on the data bus 18, which further reduces the communication time.

According to a second implementation example, the articular impedance control can be performed by a controller satisfying the following system of equations:

$$\begin{cases} \gamma = \left(K_p(q_{mv} - q_r) + K_i \int (q_{mv} - q_r)dt\right) - K_d \dot{q}_r & \text{[Math 4]} \\ \dot{q}_{mv} = u + K_d^{-1}(P - I)\gamma \\ \tau = P\gamma + K_d u \end{cases}$$

where $\gamma$ is the intermediate variable described hereinabove, and P is a behavior matrix analogous to the behavior matrix Y, the matrix P being defined from the behavior matrix Y by the following formula:

[Math 5]

$$Y = K_d^{-1}(I-P)$$

wherein "I" represents the identity matrix.

In both implementations of the impedance controller, other types of servo-control than PID servo-control can be used. e.g., the intermediate variable γ can be defined as follows, which corresponds to the application of a digital filter $e_f$ on the difference between the articular position $q_r$ and the internal state $q_{mv}$:

[Math 6]

$$\gamma = e_f - K_d \dot{q}_r$$

where the filter is given by the following formula:

[Math 7]

$$e_f = F(p)(q_{mv} - q_r)$$

where F(p) represents a Laplace transform and "p" is the Laplace variable.

Examples of operation of the articular impedance control in different modes of operation of the robot 2 will now be described.

In a first operating mode, the robot 2 operates under position control. The robot arm 4 is servo-controlled with regard to position and has to follow the articular trajectory generated (e.g. generated by the module 44) independently of the external forces exerted on the robot arm 4. The trajectory is e.g. defined by a time-dependent articular position $q_d$ and the derivative $\dot{q}_d$ thereof.

In such case, the impedance manager 48 defines a zero behavior matrix Y, i.e. the coefficients of the behavior matrix Y are all zero. Alternatively, the above corresponds to defining P equal to the identity matrix in the second implementation of the impedance controller described hereinabove.

The impedance manager 48 also requires the composite setpoint u to have the following form:

[Math 8]

$$u = \dot{q}_d + \frac{1}{T}(q_d - q_{mv})$$

where the parameter T is a time constant which has a strictly positive value.

In such case, the system of differential equations satisfied by the control system can be rewritten as follows:

[Math 9]

$$\begin{cases} (q_d - q_{mv}) + T(\dot{q}_{mv} - \dot{q}_d) = 0 \\ \tau = K_p(q_{mv} - q_r) + K_i \int (q_{mv} - q_r)dt + K_d(\dot{q}_{mv} - \dot{q}_r) \end{cases}$$

Thereby, the angular position $q_r$ is servo-controlled by the virtual position $q_{mv}$ and will follow the trajectory defined by the articular position $q_d$ after a transient regime the duration of which is determined by the time constant T, and with an accuracy which will depend on the values chosen for the gains $K_p$, $K_i$ and $K_d$.

The internal state $q_{mv}$ follows the velocity setpoints defined in the composite setpoint u in all articular directions.

In a second mode of operation, the robot 2 operates under manual control. It could be desired e.g. to control the articular forces of the robot so that same follow a predetermined articular setpoint $\tau_d$ provided by the trajectory generator 44. If the setpoint is specified by a force screw $f_d$ applied at a point on the robot, then the equivalent articular setpoint is given by the following formula:

[Math 10]

$$\tau_d = J^T f_d$$

Where J denotes the Jacobian matrix of the robot corresponding to the point of application of the force and the exponent "T" denotes the transpose of the matrix.

Such an operating mode is useful e.g. when it is desired to leave the robot arm free to allow a user to control the robot arm entirely by a simple manual movement.

In such case, the impedance manager 46 defines the behavior matrix $Y = K_d^{-1}$ (or, equivalently, P=0 for the second implementation of the impedance controller) and the composite setpoint $u = K_d^{-1} \tau_d$. The system of differential equations satisfied by the control system can be rewritten as follows:

[Math 11]

$$\begin{cases} K_d(\dot{q}_{mv} - \dot{q}_r) + K_p(q_{mv} - q_r) + K_i \int (q_r - q_{mv})dt = \tau_d \\ \tau = \tau_d \end{cases}$$

In practice, the first equation implies that the difference between the internal state $q_{mv}$ and the angular position $q_r$ converges towards zero when the predetermined articular setpoint $\tau_d$ is constant.

In practice, the gains of the PID controller have sufficiently high values to approximate that the internal state $q_{mv}$ is equal to the actual angular position $q_r$ even when the predetermined articular setpoint $\tau_d$ is not constant. In other words, the internal state $g_{mv}$ follows the measured articular positions $q_r$ of the robot arm 4 in all articular directions.

The second equation shows that the articular force setpoint sent to the robot arm 4 corresponds to the predetermined articular setpoint $\tau_d$, independently of the position of the robot arm 4.

In a third mode of operation, the robot 2 operates in a hybrid mode combining both force control and position control. The robot arm 4 has to follow a predefined trajectory while applying controlled forces in certain directions.

Such a mode of operation is useful e.g. when it is desired to be able to guide the robot arm by hand ("handguiding") while following a predefined trajectory. In particular, it is possible in this way to lock certain degrees of freedom of the robot arm 4, e.g.:
  by authorizing only manual guiding of the robot arm 4 in translation or in rotation,
  or by locking the end of the robot arm 4 in a fixed position while releasing the articulation of the segments of the robot arm,
  or alternatively by leaving the end of the robot arm 4 free but locking all or part of the articulations of the robot arm 4.

To perform such locking, all or some of the actuators M1 to M6 exert a force which opposes the manual force exerted by the user.

Such a mode of operation may also be useful when the robot is used in an industrial process for shaping a mechanical part by means of an effector 6 carried by the robot arm 4, during which the effector 6 comes into direct contact with the mechanical part, e.g. during sanding, deburring, assembly, or contour following of the part, and many other examples.

Finally, such an operating mode can be useful when the robot arm is controlled remotely with a force feedback, or when a plurality of industrial robots have to collaborate for manipulating the same object, e.g. during a process of manufacturing a mechanical part.

A first example of the hybrid mode of operation can relate to operation with a "ball joint" constraint, wherein it is desired that the end of the robot remains at a given point ($x_d$, $y_d$, $z_d$), the orientation being free. Moreover, it is desired to be able to freely move the orientation of the end of the robot, and thus the moments ($m_x$, $m_y$, $m_z$) around the point of rotation have to remain zero.

In such case, the impedance manager 46 calculates the composite setpoint u and the behavior matrix Y as follows:

$$c = \begin{pmatrix} x(q_{mv}) - x_d \\ y(q_{mv}) - y_d \\ z(q_{mv}) - z_d \end{pmatrix} \quad \text{[Math 12]}$$

$$G_f = J_{mv}^T \begin{pmatrix} 1 & 0 & 0 \\ 0 & 1 & 0 \\ 0 & 0 & 1 \\ 0 & 0 & 0 \\ 0 & 0 & 0 \\ 0 & 0 & 0 \end{pmatrix}$$

$$Y = K_d^{-1} - K_d^{-1} G_f (G_f^T K_d^{-1} G_f)^{-1} G_f^T K_d^{-1}$$

(ou $P = G_f (G_f^T K_d^{-1} G_f)^{-1} G_f^T K_d^{-1}$ for the second implementation)

$$u = -\frac{1}{T} K_d^{-1} G_f (G_f^T K_d^{-1} G_f)^{-1} c$$

where $J_{mv}$ denotes the Jacobian matrix of the robot calculated from the internal state $q_{mv}$, and $$\begin{pmatrix} x(q_{mv}) \\ y(q_{mv}) \\ z(q_{mv}) \end{pmatrix}$$

is the Cartesian position corresponding to the internal state.

The internal state $q_{mv}$ follows the articular positions $q_r$ measured in all the force-controlled directions defined by the behavior matrix Y, i.e. along the directions corresponding to the change of orientation of the end of the robot. On the other hand, the internal state $q_{mv}$ follows the velocity setpoints defined in the composite setpoint u in the velocity-controlled directions defined by the behavior matrix Y, i.e. in the directions corresponding to the translation of the end of the robot.

A second example of the hybrid mode of operation will now be described. In such mode of operation, the robot follows a trajectory in a plane (x,y), with a fixed orientation. The robot applies a time-dependent force along the z direction orthogonal to the (x,y) plane. Such hybrid mode of operation can be useful e.g. for sanding a surface e.g. in a fully automatic operation.

In the second hybrid mode of operation, the trajectory generator 44 generates the setpoints $x_d(t)$ and $y_d(t)$, which define the desired trajectory in the plane (x,y), as well as the value $f_{z,d}(t)$ of the desired force along the direction z, and sends same to the impedance manager 46.

The impedance manager 46 calculates the behavior matrix Y and the composite setpoint u as follows:

$$c = \begin{pmatrix} x(q_{mv}) - x_d(t) \\ y(q_{mv}) - y_d(t) \\ r_x(q_{mv}) \\ r_y(q_{mv}) \\ r_z(q_{mv}) \end{pmatrix}, \quad G_f = J_{mv}^T \begin{pmatrix} 1 & 0 & 0 & 0 & 0 \\ 0 & 1 & 0 & 0 & 0 \\ 0 & 0 & 0 & 0 & 0 \\ 0 & 0 & 1 & 0 & 0 \\ 0 & 0 & 0 & 1 & 0 \\ 0 & 0 & 0 & 0 & 1 \end{pmatrix}, \quad \text{[Math 13]}$$

$$Y = K_d^{-1} - K_d^{-1} G_f (G_f^T K_d^{-1} G_f)^{-1} G_f^T K_d^{-1}$$

(or $P = G_f (G_f^T K_d^{-1} G_f)^{-1} G_f^T K_d^{-1}$ for the second implementation)

$$u = K_d^{-1} G_f (G_f^T K_d^{-1} G_f)^{-1} \left( \begin{pmatrix} \dot{x}_d(t) \\ \dot{y}_d(t) \\ 0 \\ 0 \\ 0 \end{pmatrix} - \frac{1}{T} c \right) + Y J_{mv}^T \begin{pmatrix} 0 \\ 0 \\ f_{z,d}(t) \\ 0 \\ 0 \\ 0 \end{pmatrix}$$

where $J_{mv}$ denotes the Jacobian matrix of the robot calculated from the internal state, $q_{mv}$, $x(q_{mv})$ and $y(q_{mv})$ are the coordinates in the (x,y) plane of the Cartesian position of the terminal component corresponding to the internal state $q_{mv}$, and $r_x(q_{mv})$, $r_y(q_{mv})$, $r_z(q_{mv})$ represent the angular coordinates of the terminal component, corresponding to the internal $q_{mv}$.

The internal state $q_{mv}$ follows the articular positions $q_r$ measured along all the force-controlled directions defined by the behavior matrix Y, i.e. along the articular direction corresponding to the direction z. On the other hand, the internal state $q_{mv}$ follows the velocity setpoints defined in the composite setpoint u in the velocity-controlled directions defined by the behavior matrix Y, i.e. in all the other articular directions.

In the three modes of operation described, the internal state $q_{mv}$ follows the articular positions $q_r$ measured along the force-controlled directions defined by the behavior matrix Y and follows the velocity setpoints defined in the composite setpoint u along the velocity-controlled directions defined by the behavior matrix Y.

In a "impedance control" type fourth mode of operation, the robot has to behave as if the robot were connected to a point along a trajectory $p_d(t)$ by means of a spring $K_{cart}$ and a damper $B_{cart}$. The vector $p_d$ contains the Cartesian coordinates (position and orientation) of the trajectory. The associated velocity is denoted by $v_d$.

In such case, the impedance manager 46 calculates the composite setpoint u and the behavior matrix Y as follows:

[Math 14]

$$u = (K_d + J_{mv}^T B_{cart} J_{mv})^{-1} J_{mv}^T (K_{cart}(p_d - p_{mv}) + B_{cart} v_d)$$

$$Y = (K_d + J_{mv}^T B_{cart} J_{mv})^{-1}$$

wherein $p_{mv}$ is a vector of the Cartesian coordinates (positions and orientations) calculated from the internal state $q_{mv}$ and the geometric model of the robot. The characteristics e.g. of the spring $K_{cart}$ and of the damper $B_{cart}$ are given herein in the form of matrices.

For all the operating modes described, the impedance manager 46 generates the behavior matrix Y and the composite setpoint u according to the controls received from the application program execution module 42 and from the trajectory generator 44.

Returning to FIGS. 1, 2 and 3, aspects of the implementation of impedance control by the control system 8 will now be described.

As explained hereinabove, the application program execution module 42, the trajectory generator 44 and the impedance manager 46 are advantageously implemented by the central processing unit 5.

The articular impedance controller 48 and the axis controller module 12 are preferentially implemented by the auxiliary unit 7.

The calculations needed for implementing impedance control are performed periodically over time.

In a particularly advantageous manner, the central processing unit 5 is configured for periodically recalculating the composite setpoint u and the behavior matrix Y with a first calculation frequency, denoted by F1.

The articular force setpoints T are recalculated periodically in the auxiliary unit 7 with a second calculation frequency, denoted by F2, which is higher than the first frequency F1.

The second frequency F2 is e.g. between two and twenty times higher than the first frequency F1. Preferentially, the second frequency F2 is between five and ten times higher than the first frequency F1. Also preferentially, the second frequency F2 is eight times higher than the first frequency F1.

The above is particularly advantageous when the articular impedance controller 48 is implemented by the auxiliary unit 7.

Indeed, the articular impedance controller only needs to use a relatively limited number of simple arithmetic operations. Same can thus operate at high frequency. In this way it is possible to have high gains Kp, Ki and Kd, which can be used for obtaining a good stiffness and a good precision along the position-controlled directions. The more complex geometric calculations are implemented in the central unit 5.

Moreover, implementing impedance control in the auxiliary controller 7 separately from the central processing unit 5 provides a performance gain because a single processor then drives the different actuators M1 to M6. By being as close as possible to the sensors and actuators, in this way it is possible to have reduced delays in the servo-controls, and thus to obtain better performance in the end. Implementing impedance control and the axis controller module 12 in a single processor of the auxiliary unit 7 increases performance because there is no communication delay.

According to an example given for illustrative purposes, the composite setpoints u and the behavior matrices Y are calculated by the central unit 5 and transferred to the auxiliary unit every 1 milliseconds, i.e. with a frequency of 1000 Hz. Each of the components of such controls are then linearly interpolated for obtaining values for each of the calculation cycles performed with the second frequency F2, e.g. with a frequency of 8 kHz.

More generally, another advantageous aspect of the implementation of the invention lies in the fact that all the calculations performed by the impedance controller 48 including the integration of the internal state $q_{mv}$, are performed in the articular coordinates. In this way, there is no need to implement geometric transformations that are costly in terms of computational resources. Reducing the time required to perform the calculations related to impedance control during each calculation cycle also leads to higher gains Kp, Ki, Kd, and thus to obtaining better accuracy, in particular along the position-controlled directions.

In a particularly advantageous manner, the central unit 5 is configured for periodically recalculating the articular conversion matrix $T_f$ and the weight of the effector $F_g$ with a third calculation frequency, denoted by F3 and lower than the second frequency F2. The second frequency F2 is e.g. between two and twenty times higher than the third frequency F3. Preferentially, the second frequency F2 is between five and ten times higher than the third frequency F3. Still preferentially, the second frequency F2 is eight times higher than the third frequency F3. By choosing the third frequency F3 equal to the first frequency F1, the central processing unit 5 can place the articular conversion matrix $T_f$, the weight of the effector $F_g$, the behavior matrix Y and the composite setpoint u in the same data frame 30. The articular conversion matrix $T_f$ and the weight of the effector $F_g$ can then be interpolated linearly for obtaining values for each of the calculation cycles of the current loop control setpoints $\tau_{cmd}$.

The impedance control process can be used for operating effectively whatever the operating mode chosen, whether the robot is operating in force control mode, or in a position control mode, or in a hybrid mode or in an impedance control mode.

By means of to the invention, the guiding of the robot is improved when the robot has to be guided, at least partially, by hand.

Certain embodiments can be implemented independently of the other embodiments.

Figure 6:
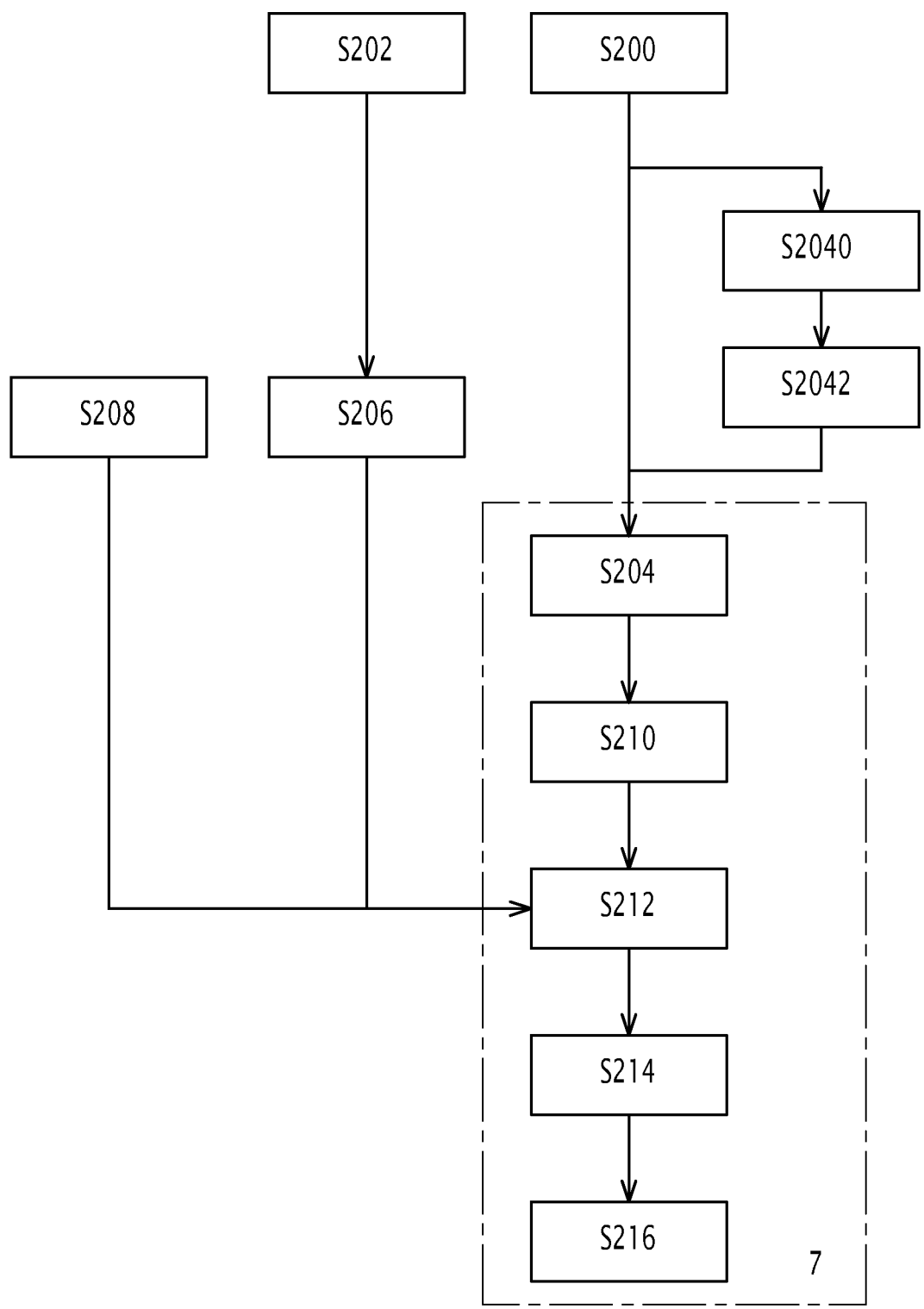
FIG. 6 diagrammatically shows a process for controlling an industrial robot according to the invention, showing the details of the taking into account of multi-dimensional external forces.

FIG. 6 shows a schematic example of implementation of an operation process according to the invention. The example described does not prevent other steps from being implemented jointly and/or sequentially with the described steps, in other embodiments.

The process starts at step S200 e.g. with the launch of a robot control program, in particular in a force or hybrid guiding mode.

In parallel, a user can, during a step S202, manipulate the robot arm 4 at the effector 6 in order to move same. The user applies a force which will affect the measurement of the multi-axis sensor 20.

During a step S204, the calculation module 10 calculates the articular force setpoint τ for controlling the axis controller module.

In a non-mandatory way, prior to step S204 and during a step S2040, the calculation module 10 calculates the composite setpoint u defining articular forces and velocities, according to the target trajectory and the operating mode and, during a step S2042, the calculation module 10 calculates the behavior matrix Y according to the operating mode. The calculation module 10 will then calculate the articular force setpoint τ for controlling the axis controller module and the time derivative $\dot{q}_{mv}$, of a homogeneous internal state $q_{mv}$ at an articular position. The calculation of the articular force setpoint τ is carried out according to said composite setpoint u, said behavior matrix Y previously calculated, the articular positions $q_r$ measured, articular velocities $\dot{q}_r$ derived from the articular positions measured $q_r$, and to the internal state $q_{mv}$.

During a step S206, the calculation module 10 calculates the articular conversion matrix $T_f$ from the articular positions $q_r$.

During a step S208, the calculation module 10 calculates the weight of the effector $F_g$ from the articular positions $q_r$. Such step is not mandatory when e.g. the weight of the effector 6 does not affect the measurement of external forces due to the kinematics of the robot arm.

During a step S210, the multi-dimensional external forces $F_s$ exerted on the effector 6, are supplied to the controller module 12.

During a step S212, the force and velocity loops 61 of the axis controller module (12) calculate the vector of the articular forces $\tau_s$ by subtracting the effector weight $F_g$ from the multi-dimensional external forces $F_s$ so as to disregard the effector weight and by applying the articular conversion matrix $T_f$ to the result, for converting the result into the articular domain. When the weight of the effector has no effect on the measurement of the external forces, the axis controller module 12 calculates the vector of the articular forces $\tau_s$ according to the multi-dimensional external forces $F_s$ exerted on the effector 6, by simply applying the articular conversion matrix $T_f$ to the result, for converting the result into the articular domain, During a step S214, the axis controller module 12 calculates current loop control setpoints $\tau_{cmd}$ by taking into account the vector of the articular forces $\tau_s$ and the articular force setpoint $\tau$.

During the step S216, the current loops 62 of the axis controller module 12 calculate the control setpoints of the power units 15 according to the control setpoints of the current loops $\tau_{cmd}$.

The axis controller module 12 is implemented by a single auxiliary unit 7. In particular, the force and velocity loops 61 are implemented on the same unit and directly receive the multi-dimensional external forces $F_s$. The calculations of the current loop control setpoints $\tau_{cmd}$ are carried out rapidly by limiting the number of data transmissions. Moreover, the calculation of the control setpoints for the current loop $\tau_{cmd}$ of an electric actuator can take into account the control setpoints for the current loops $\tau_{cmd}$ of the other electric actuators without the transmission thereof being delayed.

The invention has been described with a robot arm articulated for performing rotations. The invention is applicable to a robot comprising elements in translation with respect to each other.

The aforementioned embodiments and variants can be combined with each other so as to generate new embodiments.

The invention claimed is:

1. A control process for an industrial robot, the industrial robot comprising:
   a multi-axis robot arm comprising at least two electric actuators each configured to move one part of the multi-axis robot arm with respect to another part of the multi-axis robot arm about or along an axis of movement, each electric actuator being associated with a sensor configured for measuring articular positions of the associated electric actuator,
   an effector placed at an end of the multi-axis robot arm,
   a robot control system comprising:
   a central unit and a single auxiliary unit, the central unit and the auxiliary unit being in communication by means of a data bus,
   an axis controller module configured for calculating control setpoints of power units which deliver an appropriate electric current to the electric actuators according to an articular force setpoint and implemented by said single auxiliary unit, and a calculation module configured for determining articular force setpoints for the axis controller module, the calculation module being connected to the axis controller module,
   a data acquisition interface configured for receiving and sending the articular positions of the electric actuators measured by the sensors associated with the electric actuators, to the calculation module and to the axis controller module,
   a multi-axis force sensor configured to measure multi-dimensional external forces exerted on the multi-axis robot arm and to send the multi-dimensional external forces to the axis controller module;

wherein the control process comprises:
   calculating, in the calculation module, an articular force setpoint for controlling the axis controller module, and
   calculating, in an articular converter implemented by the central unit, an articular conversion matrix from the measured articular positions, the articular conversion matrix being sent to the auxiliary unit,
   providing the axis controller module with the multidimensional external forces exerted on the effector,
   calculating, in the axis controller module, a vector of articular forces according to the external forces exerted on the effector, by using the articular conversion matrix,
   calculating, in the axis controller module, current loop control setpoints taking into account the vector of articular forces and the articular force setpoint,
   calculating, in the axis controller module, control setpoints of the power units according to control setpoints for the current loops, and
   applying the control setpoints of the power units to command the multi-axis robot arm.

2. The control process according to claim 1, wherein the control process further comprises, prior to the calculation, in the axis controller module, of the vector of articular forces, calculating, in a gravity compensator, a weight of the effector from the measured articular positions, and wherein the calculation, in the axis controller module, of the vector of articular forces comprises subtracting the weight of the effector from the multi-dimensional external forces, so as to disregard the weight of the effector and applying the articular conversion matrix to a result of the subtraction to convert said result of the subtraction in an articular representation domain.

3. The control process according to claim 2, wherein the central unit implements the gravity compensator which calculates the weight of the effector, wherein the central unit sends the weight of the effector to the auxiliary unit for taking into account the multi-dimensional external forces exerted on the effector.

4. The control process according to claim 1, wherein the data acquisition interface, the multi-axis force sensor and the auxiliary unit communicate via the data bus configured in such a way that
   data frames travel one-way on the data bus following a communication loop connecting the data acquisition interface, the multi-axis force sensor and the auxiliary unit, the data acquisition interface and the multi-axis force sensor being placed before the auxiliary unit in any order,
   the data acquisition interface can add the measured articular positions of the actuators to the data frames during frame passage,
   the multi-axis force sensor adds the external forces exerted on the multi-axis robot arm to the data frames during frame passage,
   the auxiliary unit reads the measured articular positions of the electric actuators and the external multi-dimensional forces exerted on the multi-axis robot arm in the data frames during frame passage.

5. The control process according to claim 1, wherein the control process further comprises, prior to the calculation of the articular force setpoint for controlling the axis controller module
   calculating a composite setpoint, the composite setpoint being time-dependent and defining articular forces and velocities, according to a target trajectory and of calculating a behavior matrix which describes a desired behavior of the multi-axis robot arm, the behavior matrix defining directions wherein the composite setpoint should apply, the calculation of the articular force setpoint for controlling the axis controller module then comprising a calculation of a time derivative of an internal state at an articular position, the calculation of the articular force setpoint being dependent upon said previously calculated composite setpoint, said previously calculated behavior matrix, the measured articular positions, articular velocities derived from the measured articular positions, the internal state and a controller function which adjusts a difference between the measured articular position and the internal state, the internal state being determined by integrating said time derivative of the internal state.

6. The control process according to claim 5, wherein the articular force setpoint and the time derivative of the internal state are solutions of the following system of differential equations:

$$\begin{cases} \dot{q}_{mv} = u - Y\left(K_p(q_{mv} - q_r) + K_i \int (q_{mv} - q_r)dt - K_d \dot{q}_r\right) \\ \tau = K_p(q_{mv} - q_r) + K_i \int (q_{mv} - q_r)dt + K_d(\dot{q}_{mv} - \dot{q}_r) \end{cases}$$

where $q_{mv}$ is the function corresponding to said internal state, $\dot{q}_{mv}$ is the time derivative of the internal state $q_{mv}$, $\tau$ is the articular force setpoint, Y is the behavior matrix, $q_r$ is the articular position, gy is the time derivative of the articular position and u is said composite setpoint, and where Kp, Ki, and Kd are gains, Ki and/or Kd can be zero.

7. The control process according to claim 4, wherein the central unit implements the calculation of the composite setpoint and of the behavior matrix and wherein the auxiliary unit implements the calculation of the articular force setpoints.

8. The control process according to claim 7, wherein the central unit calculates and sends to the auxiliary unit, the composite setpoint and the behavior matrix with a first frequency and wherein the auxiliary unit calculates the articular force setpoint for controlling the axis controller module with a second frequency higher than the first frequency.

9. The control process according to claim 8, wherein the second frequency is between at least one of: two and twenty times higher than the first frequency, between five and ten times higher than the first frequency, or eight times higher than the first frequency.

10. The control process according to claim 5, wherein the calculation of the composite setpoint and the behavior matrix takes into account the internal state.

11. The control process according to claim 5, wherein a communication link is configured such that:

the central unit is master, data frames travel one-way on the data bus following a loop connecting the central unit, the data acquisition interface, the multi-axis force sensor and the auxiliary unit, the data acquisition interface and the multi-axis force sensor being placed before the auxiliary unit in any order, the auxiliary unit adds the internal state to the data frame when the during the frame passage and the data frame is fed back to the central unit at the end of each communication cycle.

12. The control process according to claim 1, wherein the auxiliary unit calculates the articular force setpoints for controlling the axis controller module with a frequency chosen between 500 Hz and 20 kHz.

13. An industrial robot control system, adapted to control an industrial robot comprising a multi-axis robot arm comprising at least two electric actuators each configured to move one part of the multi-axis robot arm with respect to another part of the multi-axis robot arm about or along an axis of movement, each electric actuator being associated with a sensor configured for measuring an articular positions of the associated electric actuator, and an effector placed at an end of the multi-axis robot arm, the control system comprising:

a central unit and a single auxiliary unit, suitable for communicating by means of a data bus, an axis controller module configured for calculating control setpoints of power units which deliver an appropriate electric current to the electric actuators according to an articular force setpoint, the axis controller module being implemented by the single auxiliary unit, the controller module comprising force and velocity loops and current control loops, and a calculation module configured for calculating articular force setpoints for the axis controller module, the calculation module being connected to the axis controller module, a data acquisition interface configured for receiving and sending the measured articular positions of the electric actuators to the calculation module and to the axis controller module, a multi-axis force sensor configured to measure multi-dimensional external forces exerted on the multi-axis robot arm and placed between the end of the multi-axis robot arm and the effector and to send the multi-dimensional external forces to the axis controller module, wherein:

the central unit implements an articular converter configured for calculating an articular conversion matrix from the measured articular positions, the articular conversion matrix being sent to the auxiliary unit, the axis controller module implements an impedance controller module configured for calculating a vector of the articular forces according to the external forces exerted on the effector using the articular conversion matrix, the axis controller module being configured for calculating current loop control setpoints taking into account the vector of articular forces and the articular force setpoint, the axis controller module being configured for calculating control setpoints of the power units according to control setpoints of the current loops, the control system being configured to apply the control setpoints of the power units to command the multi-axis robot.

14. The system according to claim 13, wherein the axis controller module comprises force and velocity loops configured for receiving the multi-dimensional external forces from the multi-axis force sensor and for calculating control setpoints for current loops and current control loops configured for calculating control setpoints of the power units.

15. An industrial robot comprising a control system according to claim 13.

16. The control process according to claim 8, wherein the second frequency is between five and ten times higher than the first frequency.

17. The control process according to claim 8, wherein the second frequency is eight times higher than the first frequency.

18. The control according to claim 1, wherein the auxiliary unit calculates the articular force setpoints for controlling the axis controller module with a frequency chosen between 5 kHz and 12 KHz.

19. The control according to claim 1, wherein the auxiliary unit calculates the articular force setpoints for controlling the axis controller module with a frequency equal to 8 KHz.

* * * * *